United States Patent
Yen

(10) Patent No.: US 8,221,114 B2
(45) Date of Patent: Jul. 17, 2012

(54) MOLD FOR FABRICATING AN OPTICAL FIBER CONNECTOR

(75) Inventor: Shih-Chieh Yen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 19 days.

(21) Appl. No.: 12/873,279

(22) Filed: Aug. 31, 2010

(65) Prior Publication Data

US 2011/0256254 A1  Oct. 20, 2011

(30) Foreign Application Priority Data

Apr. 20, 2010 (TW) ................................ 99 1 12258

(51) Int. Cl.
*B29C 33/76* (2006.01)
(52) U.S. Cl. .. 425/577; 425/467; 425/808; 425/DIG. 10
(58) Field of Classification Search ................. 425/467, 425/468, 577, 808, DIG. 10
See application file for complete search history.

(56) References Cited

U.S. PATENT DOCUMENTS

| 4,531,702 A * | 7/1985 | Plummer ...................... 425/577 |
| 5,013,495 A * | 5/1991 | Noba et al. ................ 264/328.12 |
| 6,663,377 B1 * | 12/2003 | Dean et al. .................... 425/577 |

OTHER PUBLICATIONS

Fred H. Colvin and Frank A. Stanley, American Machinists' Handbook, 1940, McGraw-Hill Book Company, 7th Edition, pp. 523-527.*

* cited by examiner

*Primary Examiner* — Tim Heitbrink
(74) *Attorney, Agent, or Firm* — Altis Law Group, Inc.

(57) ABSTRACT

A mold for fabricating an optical fiber connector is provided. The mold includes a mold body, a core pin and a positioning block. The mold body defines a molding chamber, and the molding chamber has a lens forming portion for forming a lens. The core pin is configured for insertion into the molding chamber and forming an optical fiber insertion hole. The core pin includes a first portion and a second portion thinner than the first portion. The positioning block is configured for being arranged in the molding chamber. The positioning block includes an engaging hole for engagingly receiving the second portion.

20 Claims, 5 Drawing Sheets

MOLD FOR FABRICATING AN OPTICAL FIBER CONNECTOR

BACKGROUND

1. Technical Field

The present disclosure relates to molds, and particularly to a mold for fabricating an optical fiber connector.

2. Description of Related Art

Optical fiber connectors are widely used at optical fiber communications. Such an optical fiber connector is usually located between two optical fibers where a connection is necessary or located at an end of an optical fiber communication.

A typical optical fiber connector includes an optical fiber insertion hole for receiving an optical fiber, and a lens for receiving and guiding light from the optical fiber. Tolerances for molding the optical fiber connectors, specifically the optical fiber insertion hole is critical, yet difficult to maintain necessary alignment.

What is needed, therefore, is a mold for fabricating an optical fiber connector, which addresses the above mentioned problems.

BRIEF DESCRIPTION OF THE DRAWINGS

Many aspects of the present mold can be better understood with reference to the following drawings. The components in the drawings are not necessarily drawn to scale, the emphasis instead being placed upon clearly illustrating the principles of the present mold. Moreover, in the drawings, like reference numerals designate corresponding parts throughout the several views.

DETAILED DESCRIPTION

Embodiments of the present mold will now be described in detail below and with reference to the drawings.

Figure 1:
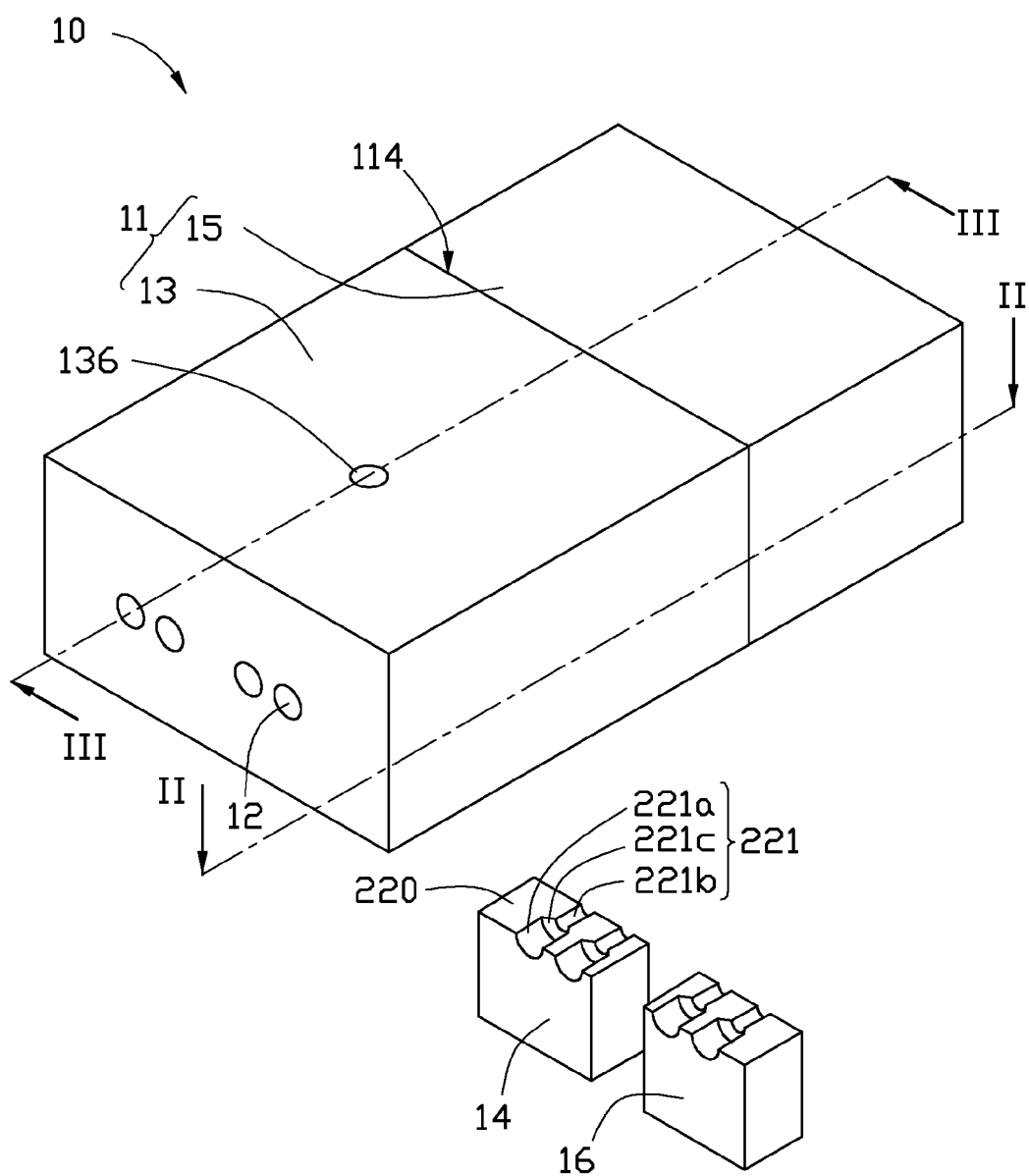
FIG. 1 is a schematic view of a mold for fabricating an optical fiber connector in accordance with a first embodiment. The mold includes a number of core pins and two positioning blocks located therein. For the illustrated purpose, the positioning blocks are taken out.
Figure 2:
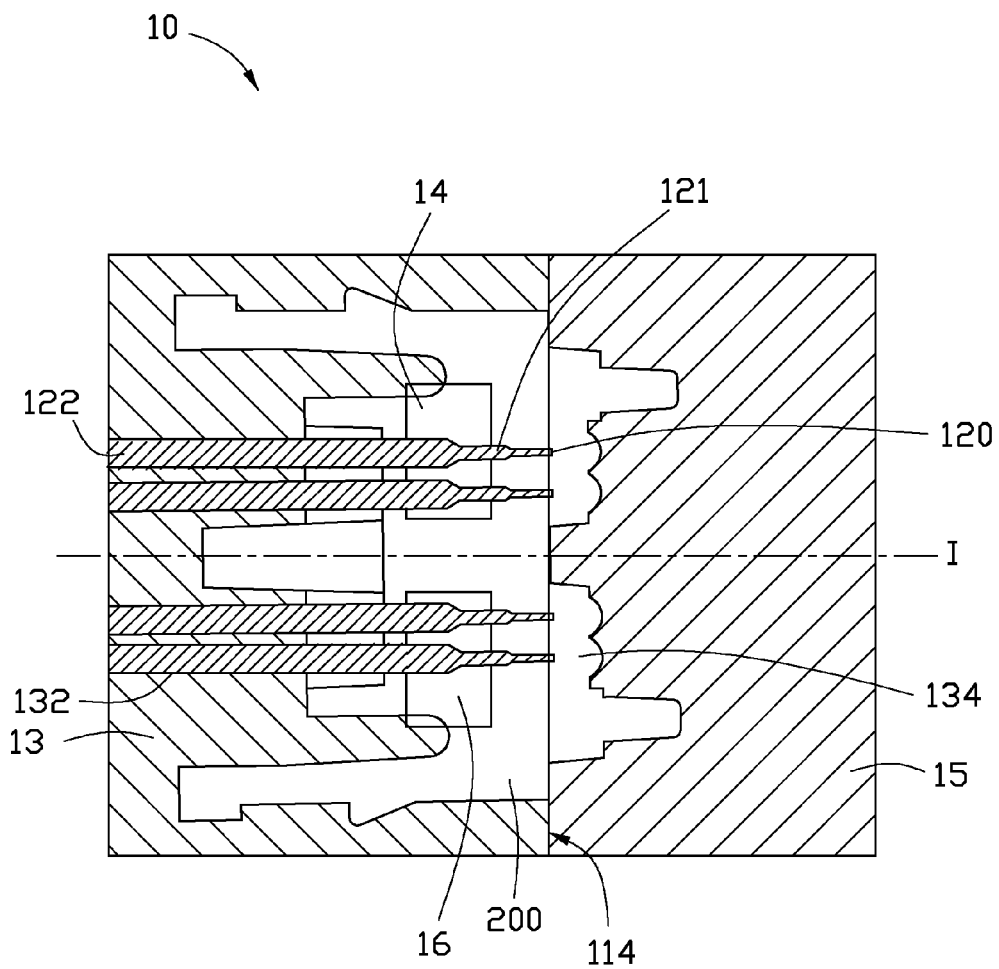
FIG. 2 is a sectional view of the mold of FIG. 1, taken along line II-II.
Figure 3:
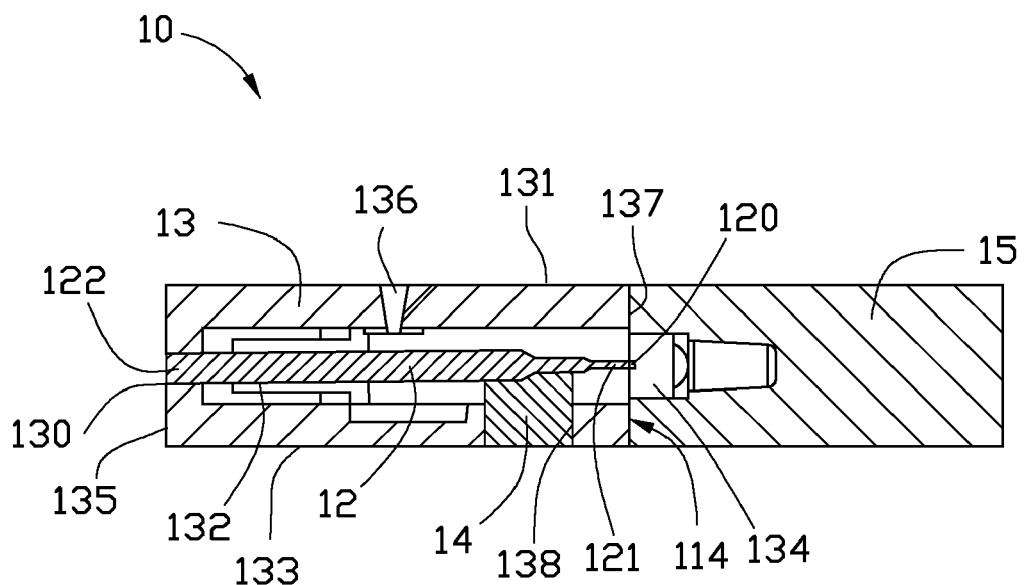
FIG. 3 is a sectional view of the mold of FIG. 1, taken along line III-III.

Referring to FIGS. 1 to 3, a mold 10 for fabricating an optical fiber connector in accordance with a first embodiment, is provided. The mold 10 includes a mold body 11, a number of core pins 12 for forming optical fiber insertion holes for receiving the optical fibers, and a number of positioning blocks 14, 16 for positioning the core pins 12 in the mold body 11.

The mold body 11 includes a core section 13 and a cavity section 15. A parting line 114 is defined between the core section 13 and the cavity section 15. In other embodiments, the core section 13 and the cavity section 15 can be integrally formed. The core section 13 and the cavity section 15 cooperatively define a molding chamber 200 therebetween. The molding chamber 200 is configured for molding the entire optical fiber connector. The core section 13 includes a top surface 131, a bottom surface 133 parallel to the top surface 131, a front surface 135 perpendicularly connected to the top surface 131 and the bottom surface 133, and a back surface 137 parallel to the front surface 135. The core section 13 defines the molding chamber 200 on the back surface 137. The core section 13 also defines an injection hole 136. The injection hole 136 is in communication with the molding chamber 200 on the top surface, and is configured for introducing a molding material into the molding chamber 200. The core section 13 further defines a pair of assembly holes 138. The assembly holes 138 are in communication with the molding chamber 200 on the bottom surface 133, and are configured for receiving the positioning blocks 14, 16. The core section 13 still further defines a number of passages 132. The passages 132 are in communication with the molding chamber 200 on the front surface 135, and are configured for receiving the core pins 12. The molding chamber 200 defines a number of lens forming portions 134 in the cavity section 15 for molding a number of lenses aligned with the respective optical fiber insertion holes. Each passage 132 has a corresponding opening 130 defined at the front surface 135 of the core section 13.

The core pins 12 can be inserted into the passages 132 from the openings 130. A shape of each of the core pins 12 is the same as that of the corresponding optical fiber insertion holes. The core pins 12 are configured to cause the molding material to form around them, thereby forming through holes in their place after the core pins 12 are removed from the passages 132, and thus obtaining the optical fiber insertion holes.

Each of the core pins 12 has a cylindrical portion (first portion) 122, a stepped-shaped portion (second portion) 121 and a tip 120. The tip 120 protrudes into the lens forming portion 134 and is aligned with the corresponding lens forming portion 134. The tip 120 has a polished surface. The polished surface helps to form a smooth portion between the corresponding optical fiber insertion hole and the corresponding lens, and the smooth portion can reduce transmission loss between the optical fiber and the lens by avoiding discoloration, splay, and/or flow marks for example. The stepped-shaped portion 121 has two steps and gradually reduces in size in steps towards the tip 120. To support the stepped-shaped portion 121 and avoid materials from flexing the core pins 12, the positioning blocks 14, 16 are positioned in the core section 13 by passing the positioning blocks 14, 16 through the corresponding assembly holes 138.

Each of the positioning blocks 14, 16 has two engaging holes 221 formed in a surface 220 thereof. The shape of each of the engaging holes 221 is the same as a corresponding portion of the stepped-shaped portion 121. Each engaging hole 221 defines a first hole portion 221a for fittingly receiving the cylindrical portion 122, and a second hole portion 221b having a smaller size than that of the first hole portion 221a for fittingly receiving the stepped-shaped portion 121. Each engaging hole 221 further defines a step-shaped hole portion 221c for fittingly receiving a step between the cylindrical portion 122 and the stepped-shaped portion 121. The engaging holes 221 help to stabilize the stepped-shaped portion 121 during the molding process, in order to maintain a straight passage of the molded optical fiber hole.

Figure 4:
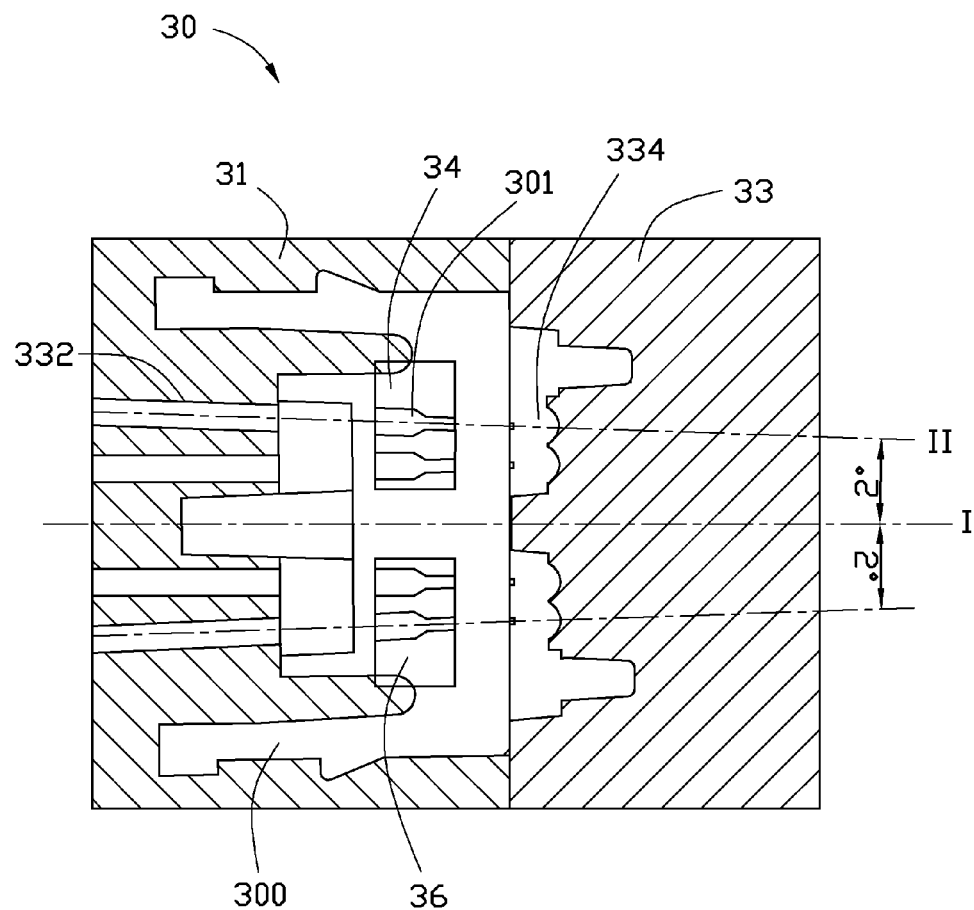
FIG. 4 is a sectional view of a mold for fabricating an optical fiber connector in accordance with a second embodiment.

Referring to FIG. 4, a mold 30 for fabricating an optical fiber connector in accordance with a second embodiment, is provided. The mold 30 is essentially similar to the mold 10 illustrated above, however, a pair of symmetrical passages 332 of a core section 31 and corresponding engaging holes 301 of positioning blocks 34, 36 (e.g., a central axis II thereof) are angled relative to a central axis I of a molding chamber 300 to form the entire optical fiber connector. The angle may be about 2 degrees for example in the same plane. This angle may compensate for a partial rush of a molding material when the molding material has greater fluidity at the position. The fluidity of the molding material at the position can be known beforehand by mold flow simulation. The pins located at the passages 332 and as well as the corresponding engaging holes 301 can be moved to align with corresponding lens forming portions 334 in a cavity section 33 by the partial rush of the molding material.

Figure 5:
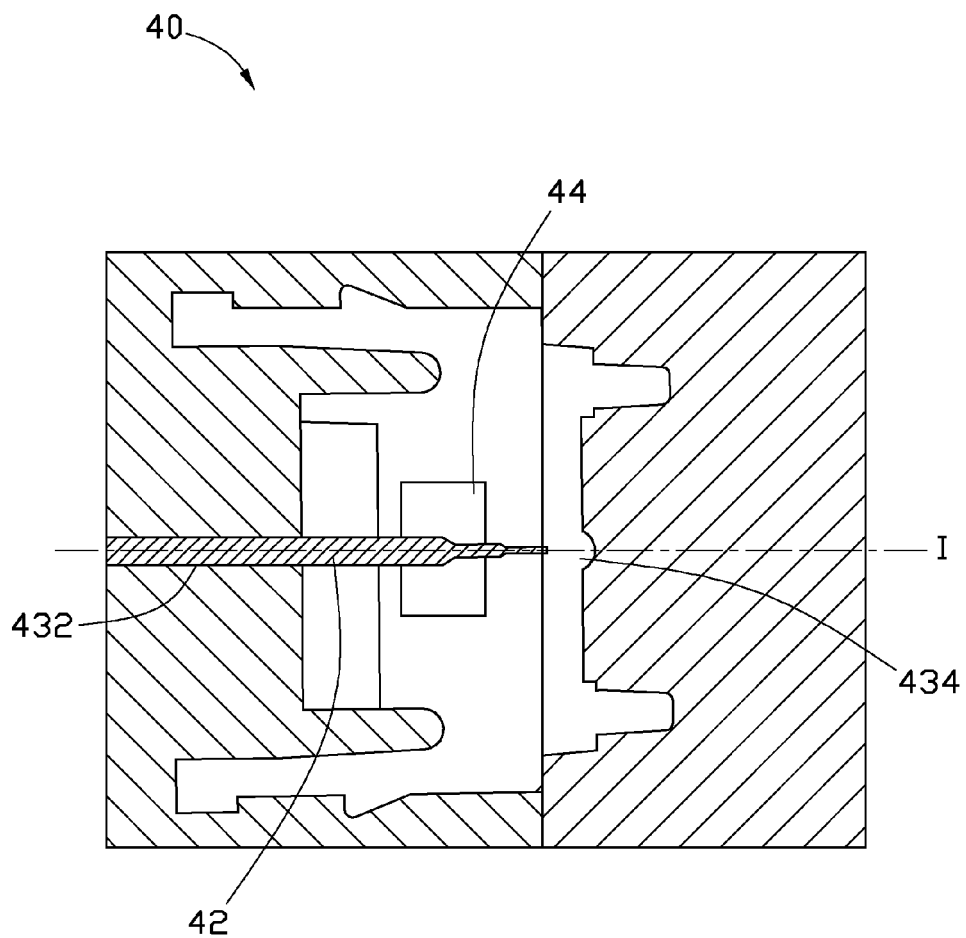
FIG. 5 is a sectional view of a mold for fabricating an optical fiber connector in accordance with a third embodiment.

Referring to FIG. 5, a mold 40 for fabricating an optical fiber connector in accordance with a third embodiment, is provided. The mold 40 is essentially similar to the mold 10 illustrated above, however, the mold 40 has only one passage 432, only one positioning block 44, and only one lens forming portion 434. That is, in the optical fiber connector, only one optical fiber insertion hole is formed, and only one lens is formed. A core pin for forming the optical fiber insertion hole is located along a central axis I of the entire optical fiber connector.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A mold for fabricating an optical fiber connector, the mold comprising:
    a mold body defining a molding chamber therein, the molding chamber having a lens forming portion for forming a lens;
    a core pin configured for insertion into the molding chamber and forming an optical fiber insertion hole of the optical fiber connector, the core pin comprising a first portion and a second portion thinner than the first portion, the second portion comprising:
    a main body; and
    a step interconnecting the main body and the first portion; and
    a positioning block configured for being arranged in the molding chamber, the positioning block comprising an engaging hole for engagingly receiving the step of the core pin.

2. The mold of claim 1, wherein the second portion comprises a tip extending into the lens forming portion and configured for aligning with the lens forming portion.

3. The mold of claim 2, wherein the tip has a polished surface.

4. The mold of claim 1, wherein the engaging hole includes a first hole portion for fittingly receiving the first portion and a second hole portion having a smaller size than that of the first hole portion for fittingly receiving the second portion.

5. A mold for fabricating an optical fiber connector, the mold comprising:
    a plurality of core pins configured for forming optical fiber insertion holes of the optical fiber connector;
    a mold body comprising a core section for receiving the core pins, and a cavity section, the core section and the cavity section cooperatively defining a molding chamber, the molding chamber comprising a plurality of lens forming portions aligning with the respective core pins and configured for forming a plurality of lenses, each of the core pins comprising a first portion and a second portion thinner than the first portion, the second portion comprising:
    a main body; and
    a step interconnecting the main body and the first portion; and
    a plurality of positioning blocks being arranged in the core section, each of the positioning blocks comprising a plurality of engaging holes for receivingly engaging the steps of the core pins.

6. The mold of claim 5, wherein each second portion comprises a tip aligned with the corresponding lens forming portion.

7. The mold of claim 6, wherein each tip has a polished surface.

8. The mold of claim 5, wherein each engaging hole includes a first hole portion for fittingly receiving the first portion and a second hole portion having a smaller size than that of the first hole portion for fittingly receiving the second portion.

9. The mold of claim 5, wherein the core pins are nonparallel but located in a common plane.

10. The mold of claim 5, wherein an angle between each two adjacent core pins is about 2 degrees.

11. A mold for fabricating an optical fiber connector, the mold comprising:
    a mold body defining a molding chamber for forming the optical fiber connector and a passage in communication with the molding chamber;
    a core pin inserted in the passage and extending into the molding chamber for forming an optical fiber insertion hole in the optical fiber connector, the core pin comprising a first portion and a second portion thinner than the first portion, the second portion comprising:
    a main body; and
    a step interconnecting the main body and the first portion; and
    a positioning block arranged in the molding chamber for positioning the core pin, the positioning block comprising an engaging hole aligned with the passage for engagingly receiving the step of the core pin.

12. The mold of claim 1, wherein the mold body comprises a top surface and a bottom surface parallel to the top surface, and the mold body defines an injection hole on the top surface for introducing a molding material into the molding chamber.

13. The mold of claim 12, wherein the mold body defines an assembly hole on the bottom surface, and the positioning block is arranged in the molding chamber after having passed through the assembly hole.

14. The mold of claim 12, wherein the mold body further comprises a front surface perpendicularly connected to the top surface and the bottom surface, the mold body defines a passage in communication with the molding chamber on the front surface, and the core pin extends into the molding chamber from the outside of the mold body via the passage.

15. The mold of claim 1, wherein the step is sloped from the main body to the first portion.

16. The mold of claim 5, wherein the core section comprises a top surface and a bottom surface parallel to the top surface, and the mold body defines an injection hole on the top surface for introducing a molding material into the molding chamber.

17. The mold of claim 16, wherein the core section defines a number of assembly holes on the bottom surface, and the positioning blocks are arranged in the molding chamber after having passed through the corresponding assembly holes.

18. The mold of claim 16, wherein the core section further comprises a front surface perpendicularly connected to the top surface and the bottom surface, the core section defines a number of passages in communication with the molding chamber on the front surface, and the core pins extend into the molding chamber from the outside of the mold body via the corresponding passages.

19. The mold of claim 11, wherein the core section comprises a top surface and a bottom surface parallel to the top surface, and the mold body defines an injection hole on the top surface for introducing a molding material into the molding chamber.

20. The mold of claim 19, wherein the core section defines an assembly hole on the bottom surface, and the positioning block is arranged in the molding chamber after having passed through the assembly hole.

* * * * *